United States Patent [19]

Narita

[11] 4,245,450
[45] Jan. 20, 1981

[54] CONNECTING STRUCTURE OF ORNAMENTAL TRIMS OR TRIM STRIPS

[75] Inventor: Kozi Narita, Nagoya, Japan

[73] Assignee: Inoue Gomu Kogyo Kabushiki Kaisha, Aichi, Japan

[21] Appl. No.: 967,628

[22] Filed: Dec. 8, 1978

[30] Foreign Application Priority Data

Dec. 4, 1978 [JP] Japan ............................... 53-166946

[51] Int. Cl.³ ............................................. E04F 19/02
[52] U.S. Cl. .................................................... 52/716
[58] Field of Search ................................ 52/716–718; 428/31

[56] References Cited

U.S. PATENT DOCUMENTS

| | | | |
|---|---|---|---|
| 2,047,747 | 7/1936 | Schemmel | 52/716 |
| 2,821,754 | 2/1958 | Hillson | 52/716 |
| 2,884,669 | 5/1959 | Hillson | 52/716 X |
| 3,016,590 | 1/1962 | Shanok et al. | 52/718 X |
| 3,246,433 | 4/1966 | Eriksson | 52/716 |
| 3,756,636 | 9/1973 | Jackson | 52/717 X |
| 3,914,482 | 10/1975 | Sawa et al. | 52/716 X |

FOREIGN PATENT DOCUMENTS 864416  4/1961  United Kingdom ................. 52/716

Primary Examiner—J. Karl Bell
Attorney, Agent, or Firm—Armstrong, Nikaido, Marmelstein & Kubovcik

[57] ABSTRACT

Trim structure for connecting ornamental trims or trim strips comprising a plastic substrate layer and a metal foil stuck on front surface of the substrate layer, wherein a half portion of a junction piece is adhered to the rear surface of the substrate layer at one terminal portion of the trim, and the terminal portion of another trim is fitted to the other half portion of the junction piece.

8 Claims, 9 Drawing Figures

_CONNECTING STRUCTURE OF ORNAMENTAL TRIMS OR TRIM STRIPS_

BACKGROUND OF THE INVENTION

1. Field of the invention

The present invention relates to connecting structure of the terminal portions of ornamental trims or trim strips used for automobiles, and more specifically to connecting structure of ornamental trims or trim strips used around edges of windows and for rain water troughts, the edges of doors, front grille, lamp housing etc.

2. Description of the Prior Art

A variety of ornamental trims or trim strips have long been used around the edges of windows of automobiles for the purpose of protecting the junction portions between windowpanes and the car body and presenting ornamental effects on the junction portions.

Particularly, it is a modern tendency to directly attach the windowpanes to the car body using an adhesive agent, this requires the ornamental trims or trim strips to satisfy both the function for concealing the adhered portions and the function for protecting the edges of glasses. According to such structure, the ornamental trims or trim strips were directly attached to the car body or the glass without using, say, the conventionally employed H-shaped weather strips for holding the ornamental trims or trim strips. For this purpose, it has been desired to provide structure which is capable of rigidly and beautifully connecting the junction portions of the ornamental trims or trim strips.

Ornamental trims or trim strips which are now widely used are generally made of a stainless steel or aluminum. The terminal portions of such metallic trims or trim strips are usually covered with coupling metal fittings and connected by caulking, or one end of the trim is contracted or expanded by way of press molding and covered by or inserted into one end of another strip.

Therefore, a step tends to develop at the junction portion, or flaws develop at the time of pressing to deteriorate the appearance. Further, the metallic ornamental trims are heavy in weight and have problems in assembling performability.

SUMMARY OF THE INVENTION

The inventor of the present invention has invented light-weight ornamental trims or trim strips, comprising a substrate member made of a plastic material and a metal foil stuck on the surface of the substrate member.

A first object of the present invention, therefore, is to provide structure for connecting the terminals of ornamental trims or trim strips that are light in weight.

A second object of the present invention is to provide structure for connecting the terminals of ornamental trims or trim strips without developing steps.

A third object of the present invention is to provide structure for connecting the terminals of ornamental trims or trims strips without almost causing the weight increase at the connection portions.

A fourth object of the present invention is to provide structure which is highly convenient for attaining connecting portions of the terminals of ornamental trims or trim strips.

BRIEF DESCRIPTION OF THE DRAWINGS

Embodiments of the present invention will be explained by referring to the drawings.

DESCRIPTION OF THE PREFERRED EMBODIMENTS

Figure 1:
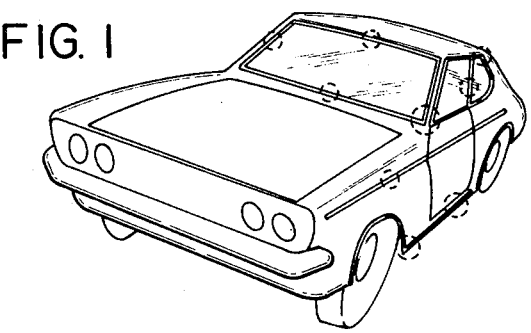
FIG. 1 is a perspective view of an automobile to which the ornamental trims are provided.

Trims or trim strips are used for automobiles at places surrounded by circles in FIG. 1.

Figure 2:
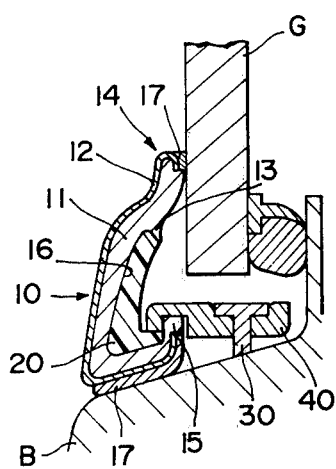
FIG. 2 is an enlarged cross-section view of a linear connection portion of the ornamental trims.

FIG. 2 is a cross-sectional view showing a linear connecting portion at which the trims or trim strips are connected according to an embodiment of the present invention. Here, the trim or trim strip 10 consists of a plastic substrate member 11 and a metal foil 12 stuck on the outer surface of the substrate member. The substrate member has nearly a C-shape or an L-shape in cross section, and an edge 14 on one side is in contact with the surface of a glass G and an edge 15 on the other side is designed to be secured to a fitting portion of a clip 40 held by a T-shaped stud 30 formed on the surface of the car body B. A projection 13 is continuously formed in the lengthwise direction on the inner side of the substrate member 11, and a groove 16 is formed between the projection 13 and the curved edge 15 to be secured to the clip 40. The metal foil 12 is stuck along the outer shape of the substrate member so as to cover front surface of the substrate member, and the edges of the metal foil cover the edges of the plastic substrate member, or the edges of the metal foil are partly embedded in the substrate member.

In FIG. 2, elastic members 17 that serve as buffer members with respect to the glass and the car body are stuck both to the portions of the trim or trim strip 10 that come into contact with the surface of the glass, i.e. the edge 14 on one side and to the edge that come into contact with the car body, i.e. the oute. surface of the metal foil of the trim or trim strip 10 which is so folded as to be secured to the clip.

The substrate member constituting the trim or trim strip 10 is made of a plastic material having relatively great thermal resistance, such as acrylonitrilebutadiene styrene resin (hereinafter referred to as ABS resin), polyvinyl chloride resin, polycarbonate resin, or polyphenylene oxide resin, and the metal foil is made of, say, a stainless steel or aluminum of a thickness of 50 to 200 microns. The elastic material stuck onto the outer surface of the trim as a buffer member with respect to the glass or the car body, is composed of an elastomer such as soft polyvinyl chloride resin (ethylene vinyl acetate resin or the like).

Figure 4:
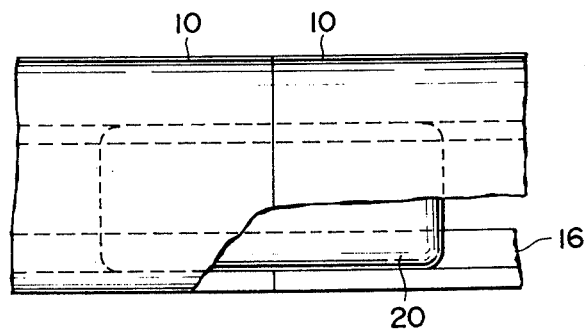
FIG. 4 is a see-through view of the linear connection portion of FIG. 1.

According to this embodiment, a junction piece 20 has an outer shape which is nearly the same as the inner shape of the groove 16 formed between the projection 13 and the side edge 15 of the trim or trim strip 10, and is fitted to the groove 16 in the rear surface of the trim or trim strip 10. As shown in the see-through view of FIG. 4, a half portion of the junction piece 20 is inserted in the terminal portion of one trim or trim strip 10, and the other half portion of the junction piece 20 is fitted to the terminal portion of an adjacent trim or trim strip which is to be joined to the first trim strip.

The thus fitted junction piece is joined to at least one terminal portion of the trims or trim strips by means of adhesion or melt-adhesion; both of the terminal portions of the trims to be connected to the junction piece need not be adhered.

Figure 5:
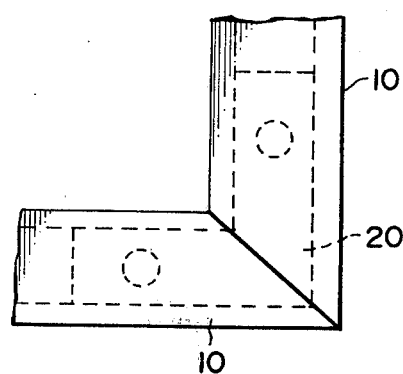
FIG. 5 is an enlarged see-through view showing a connection portion at a corner of FIG. 1.
Figure 6:
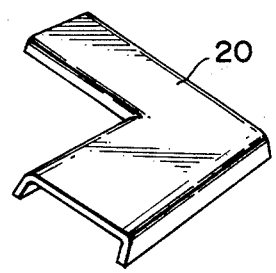
FIG. 6 is a perspective view of a junction piece used for effecting connection at a corner of FIG. 5.

FIGS. 5 and 6 show another embodiment of the present invention. That is, FIG. 5 and FIG. 6 are a see-through view showing a connection portion at a corner of window of FIG. 1, and a perspective view of the junction piece used for this connection respectively. The structure and cross section of the trim or trim strip of FIG. 5 are the same as those of FIG. 2 except that one end of the trim is cut obliquely. Here, the terminal portions of the trim or trim strip are cut at an angle of 45°, and the junction piece is so formed that its corner forms right angles in connected state. That is, a half portion of the junction piece is inserted in one terminal portion of a trim or trim strip, and the other half portion of the junction piece is adhered to the terminal portion of another trim or trim strip, thereby attaining the connection. In this case, both of the trim or trim strip are not necessarily adhered to the junction piece, but they may be adhered. In order to connect the trims or trim strips together at a desired angle, both ends of the junction piece should be so formed as to define a desired angle beforehand, and the terminal portions of the trims or trim strips should also be cut at corresponding angles.

The junction piece preferably has an outer shape which is the same as the inner shape of the substrate member constituting the trim or trim strip, as mentioned earlier. Needless to say, the shape of the junction piece, however, is not necessarily limited to the abovesaid shape only, nor the shape of the trim or trim strip is necessarily limited to those as illustrated above.

Figure 3A:
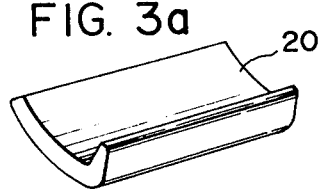
FIGS. 3 (a) and (b) are perspective views of junction pieces made of a plastic material and a wire netting embedded into a plastic material.
Figure 3B:
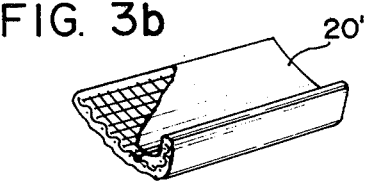

The junction piece is preferably made of plastic or metal which can be adhered onto the substrate member by means of an adhesive agent or melt-adhered onto or embedded into the substrate member by way of ultrasonic waves. In the former case, the junction piece is preferably made of a plastic material which is the same as the material of the substrate member or which is compatible with the substrate member. For instance, when the substrate member is made of an ABS resin, the junction piece should be made of the ABS resin, or polystyrol resin, polyvinyl chloride resin or the like [FIG. 3 (a)]. In the latter case, a wire netting 20' or a wire netting coated with a plastic material will be desirable for being embedded into or melt-adhered to the substrate member by way of ultrasonic waves [FIG. 3(b)].

Figure 7A:
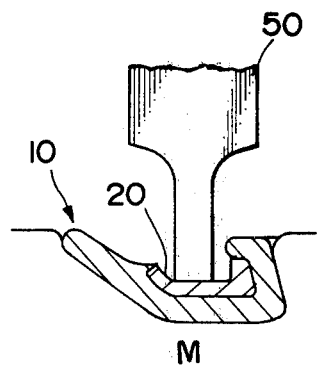
FIG. 7(a) is a transverse cross-section view of the ornamental trims and a horn during a step of melt-adhering the junction piece to the ornamental trim by way of ultrasonic waves.
Figure 7B:
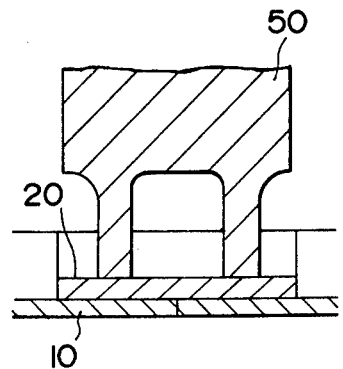
FIG. 7(b) is a longitudinal cross-section view of the ornamental trims and the horn when the junction piece is being melt-adhered onto the terminal of the ornamental trim by way of ultrasonic waves.

The method for forming the connection structure according to the present invention is mentioned below with reference to FIG. 7. There will be no need of illustrating the method of connecting the junction piece to the trim using an adhesive agent. Therefore, below is illustrated the connecting method of the trim to the junction piece by way of ultrasonic waves. As mentioned earlier, one portion of the junction piece is inserted in a terminal portion of a trim, and the other half portion thereof is inserted in a terminal portion of another trim. Then the coupled trims are placed on a plate M (made of wood or the like) having a groove close to the outer shape of the trim. Then, to both of the thus fitted trims is pressed an ultrasonic wave horn 50 (the tips of the horn are designed to be brought into intimate contact with the portions on one side of the junction pieces and the tips of the horn may be located on terminal portions of the trims or trim strips as shown), and ultrasonic waves are applied to at least one of the trims or trim strips. Thus, the inner surface of the substrate member consituting the trims or trim strips and the junction piece are melt-ahdered together by the ultrasonic vibration. The ultrasonic waves employed here will have a frequency of from 14 KHz to 30 KHz, and ultrasonic waves application of 0.5 to 3 seconds, or about 10 seconds at the longest will be satisfactory.

As the embodiment in FIG. 6, a L-shaped wire netting or a L-shaped wire netting which is covered with a plastic material is also available.

EXAMPLE 1

A plastic junction piece made of an ABS resin having a thickness of 1.5 mm is inserted into terminal portions of two ornamental trims having nearly a C-shape in cross section made of a substrate member of an ABS resin of a thickness of 2 mm and a stainless steel foil of a thickness of 0.125 mm laminated on the front surface of the substrate member. Using a horn having a tip of a diameter of 8 mm, the ultrasonic waves of a frequency of 18 KHz were applied to the trims placed on a plate for one second to melt-adhere them.

EXAMPLE 2

The procedure was repeated in the same manner as in Example 1. Using a horn having a tips of 5×30, ultrasonic waves of a frequency of 18 KHz was applied for two seconds to one of the trims into which the junction piece was inserted, thereby to effect the melt-adhesion.

What is claimed is:

1. An ornamental trim structure comprising at least two trim strips each of said trim strips comprising a plastic substrate and a metal foil laminatd on the front surface of said substrate, said substrate having a groove of a predetermined shape formed in the rear surface thereof, said groove extending over the entire length of said substrate, and a projection means extending from the substrate at one edge of said groove; and a junction means having a portion thereof in the grooves of adjacent ones of said at least two trim strips, said junction means having a shape which is the same as said predetermined shape and wherein said projection means engages said junction means to hold said junction means in said groove.

2. An ornamental trim structure as set forth in claim 1 wherein said predetermined shape is an L-shape.

3. An ornamental trim structure as set forth in claim 1 wherein said predetermined shape is a C-shape.

4. An ornamental trim structure as set forth in claim 1, wherein said junction means is adhered to the terminal portions of adjacent ones of said at least two substrates.

5. An ornamental trim structure as set forth in any of claims 1-4, wherein said junction means is a plastic material.

6. An ornamental trim structure as set forth in claim 5 wherein said substrate is a plastic material compatible with the plastic material of said junction means.

7. An ornamental trim structure as set forth in claim 1, wherein said junction means includes a metal member.

8. An ornamental trim structure as set forth in claim 7, wherein said metal member is a wire netting or a wire netting which is coated with a plastic material.

* * * * *